United States Patent
Kaszas

(10) Patent No.: US 6,841,642 B2
(45) Date of Patent: Jan. 11, 2005

(54) PROCESSABILITY BUTYL RUBBER AND PROCESS FOR PRODUCTION THEREOF

(75) Inventor: Gabor Kaszas, London (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/362,202

(22) PCT Filed: Aug. 21, 2001

(86) PCT No.: PCT/CA01/01188

§ 371 (c)(1),
(2), (4) Date: May 23, 2003

(87) PCT Pub. No.: WO02/16452

PCT Pub. Date: Feb. 28, 2002

(65) Prior Publication Data

US 2003/0187173 A1 Oct. 2, 2003

(30) Foreign Application Priority Data

Aug. 24, 2000 (CA) .............................................. 2316741

(51) Int. Cl.[7] .............................................. C08F 236/00
(52) U.S. Cl. ........................ 526/339; 526/282; 526/308; 526/336; 525/332.1; 525/332.2; 525/332.8
(58) Field of Search ................................ 526/282, 308, 526/336, 339; 525/332.1, 332.2, 332.8

(56) References Cited

U.S. PATENT DOCUMENTS

| | | | |
|---|---|---|---|
| 2,671,774 A | 3/1954 | McCracken et al. | 260/80.7 |
| 2,729,626 A | 1/1956 | Welch et al. | 260/80.7 |
| 2,781,334 A | 2/1957 | Turner et al. | 260/80.7 |
| 2,830,973 A * | 4/1958 | Leary | 526/237 |
| 3,214,358 A | 10/1965 | D'Alelio | 204/154 |
| 3,511,821 A * | 5/1970 | Buchmann et al. | 526/308 |
| 4,139,695 A | 2/1979 | Thaler et al. | 526/308 |
| 5,071,913 A | 12/1991 | Powers et al. | 525/87 |

FOREIGN PATENT DOCUMENTS

| | | |
|---|---|---|
| DE | 44 26 756 | 2/1996 |
| GB | 1143690 | 2/1969 |

OTHER PUBLICATIONS

J. Applied Poly. Sci., vol. 11, (month unavailable), 1967; pp. 321–334; J. L. White et al.
Rubber Chem., Tech., vol. 50, (month unavailable) 1976, pp. 163–185, J. White.
Encyl. of Poly. Sci. & Eng., Suppl. vol., J. Wiley & Sons, Inc., (month unavailable), 1989, p. 343–351, H. H. Winter "Gel Point".
Kautschuk and Gummi Kunststoffe, vol. 44, No. 2, (month unavailable) 1991, H. C. Booji.
J. Macromol. Sci., Chem, A1(6), (Oct.) 1967, pp. 995–1004, Kennedy et al.

* cited by examiner

Primary Examiner—Fred Teskin
(74) Attorney, Agent, or Firm—Godfried R. Akorli; Jennifer R. Seng

(57) ABSTRACT

A butyl polymer having improved processability is described, together with a process for production thereof. The butyl polymer derived from a reaction mixture which contains: (i) a monomer mixture comprising a C4 to C7 monoolefin monomer (preferably isobutylene) and a C4 to C14 multiolefin monomer (preferably isoprene); (ii) a multiolefin cross-linking agent (preferably divinyl benzene); and (iii) a chain transfer agent (preferably diisobutylene (2,2,4-trimethyl-1-pentene)). The subject butyl polymer has an improved balance of cold flow, filler dispersion, extrusion rate and die swell.

44 Claims, 14 Drawing Sheets

PROCESSABILITY BUTYL RUBBER AND PROCESS FOR PRODUCTION THEREOF

FIELD OF THE INVENTION

In one of its aspects, the present invention relates to a butyl polymer having improved processability. In another of its aspects, the present invention relates to a process for production of such a butyl polymer.

BACKGROUND OF THE INVENTION

Butyl polymer or rubber is well known in the art, particularly in its application in the production of tires.

The terms butyl polymer and butyl rubber are well known, interchangeably used terms of art and, as will be described in more detail hereinbelow, relate to a copolymer of an isoolefin and a conjugated diene. Generally, commercial butyl polymer is prepared in a low temperature cationic polymerization process using Lewis acid-type catalysts, of which a typical example is aluminum trichloride. The process used most extensively employs methyl chloride as the diluent for the reaction mixture and the polymerization is conducted at temperatures on the order of less than −90° C., resulting in production of a polymer in a slurry of the diluent. Alternatively, it is possible to produce the polymer in a diluent which acts as a solvent for the polymer (e.g., hydrocarbons such as pentane, hexane, heptane and the like). The product polymer may be recovered using conventional techniques in the recovery of rubbery polymers.

Elastomers go through a multitude of operations in the process of making a rubbery article. They are exposed to different shear rates and stresses during operations such as storage, mixing, milling, calendering, extrusion, injection molding and forming. The rheological behavior of the elastomers in the raw or compounded form is critical from the viewpoint of processability. These rheological properties are ultimately determined by the structural characteristics of the elastomer. For a review of processability issues and their relationship to rheological behavior, as well as structural characteristics of the polymer see, for example, J. L. White and N. Tokita: J. Applied Polymer Science, vol. 11, pp. 321–334 (1967) or J. White: Rubber Chem. Technol, vol. 50, pp. 163–185 (1976).

The requirements at different stages of processing are frequently contradictory. For example, it is desired that the polymer have certain strength in order to resist cold flow during storage or transportation. Higher elasticity or green strength can also be beneficial in forming operations to prevent excessive flow of the compound as it is shaped or formed. In this respect a high viscosity material is preferred, showing a high degree of elastic memory. It is generally believed that resistance to cold flow can be improved by increasing the molecular weight of the polymer or by increasing long chain branching. In contrast, during extrusion or injection molding it is often desirable to have a polymer with low viscosity and reduced elasticity in order to ensure high extrusion rates and dimensional stability. Rapid relaxation of stresses during these operations is also desirable so that the extruded article does not change its shape during the post-extrusion handling of the material. Increasing molecular weight or long chain branching can have a negative impact on these operations because of the increased elasticity. Very high elastic memory can also result in poor filler incorporation in a mixer or on a mill.

In addition to molecular weight and long-chain branching, the molecular weight distribution (MWD) of the elastomer is equally important. For example, narrow molecular weight distribution is believed to result in crumbling of the elastomer on a mill or in a mixer. Broadening of MWD can help to eliminate this problem. However, as MWD is increased, elasticity of the polymer will increase, resulting in an increase of die swell or compound shrinkage.

Dynamic testing is often used to assess rheological and processability characteristics of polymers. The key values derived from dynamic testing are the Storage Modulus (G'), Loss Modulus (G") and Tangent Delta (tan δ). The Storage Modulus is a measure of stored energy or elasticity. The Loss Modulus is a measure of lost energy or viscous property. Tangent delta is the ratio of the two moduli (tan δ=G"/G'). Higher tan δ indicates that the sample will flow under stress rather than store the energy it was exposed to. Conversely, lower tan δ indicates that the sample will resist flow and show increased elasticity. Plotting the logarithm of tan δ as a function of the angular frequency (ω) provides very valuable information about the rheological behavior of the polymer. The slope of this curve can also be related to the molecular weight distribution and long chain branching of the polymer. Generally, a decrease in this slope is believed to indicate an increase in long chain branching or broadening of the molecular weight distribution. As the degree of branching is increased the slope decreases and eventually becomes zero. It is known that polymers close to, or at, the gel point have a frequency-independent tangent delta. For further information (see for example H. H. Winter: "Gel Point" in Encyclopedia of Polymer Science and Engineering, Supplement Volume, John Wiley & Sons, Inc. pp. 343–351 (1989), H. C. Booji: Kautschuk and Gummi Kunststoffe, Vol. 44, No. 2, pp. 128–130 (1991)).

The prior art contains numerous examples oriented toward the improvement of the processability of elastomers. As mentioned above, increasing long chain branching can reduce cold flow. One method of increasing long chain, branching is the introduction of a multifunctional monomer, such as divinyl benzene (DVB), into the polymerization mixture. When DVB is added to a polymerization mixture it will cause branching of the linear chains, as well as causing broadening of the molecular weight distribution. Using very low concentration of DVB will produce mostly linear chains containing only a few pendant vinyl aromatic groups. However, some of the growing chains will react with these pendant groups and the chain will grow through, resulting in an X-shaped molecule. This will double the molecular weight of the resulting polymer, leading to the broadening of the molecular weight distribution as linear and X-shaped molecules co-exist. As DVB concentration is increased, more chains will participate in this branching reaction and an increasing number of them will be able to react with more than one pendant group. This process will result in several jumps in molecular weight and each jump will lead to the formation of a new "population". However, due to the statistical nature of the polymerization reaction, the final product will not be uniform, but will be a mixture of these different "populations". There will be still linear chains present in the final product along with the X-shaped and other "populations" representing higher degrees of branching. Further increase in the amount of DVB will result in the formation of gel. The gel content will be dependent on the amount of DVB added to the polymerization mixture.

U.S. Pat. No. 2,781,334 [Welch et al. (Welch #1)] teaches the use of divinyl benzene in a butyl polymer production process to improve the green strength of the resulting polymer. Specifically, Welch #1 teaches that adding a small amount of DVB (0.1 to 0.8 weight %, preferably 0.4 to 0.8 weight %) to the polymerization system yields an oil-soluble, low gel, interpolymer. The physical properties are purportedly improved by a reduction in the cold flow of the polymer. However, a decrease in extrusion rate and an increase in die swell were also observed. This can be attributed to the increase of the molecular weight and long chain branching caused by the incorporation of DVB.

U.S. Pat. No. 2,729,626 [Welch et al. (Welch #2)] teaches that the use of 0.8 to 4 weight % DVB in the monomer feed produces a substantially insoluble terpolymer. This terpolymer can purportedly be used to make vulcanized products having improved physical properties with regard to modulus values. It is also claimed that copolymers containing no more than about 4% DVB have an extrusion rate sufficiently high to make extrusion practical.

U.S. Pat. No. 2,671,774 [McCracken et al. (McCracken)] teaches the production of products made using 4 to 10 weight % DVB in the monomer feed. Such products contain more than 80% gel. McCracken teaches that these products have greatly reduced cold flow. The achievable extrusion rate is purportedly higher than that of the unmodified polymer and die swell is decreased. McCracken also teaches that the blends of the product terpolymers with isoolefin-mutiolefin copolymers are also quite useful. However, the presence of gel in the polymer also resulted in the deterioration of cured properties (see Table II of McCracken). For example, tensile strength and elongation of the cured rubber decreased. This is not surprising, since the partially cross-linked rubber would not be able to homogeneously mix with the curatives and filler. In general, the presence of gel, especially in high amounts, in an interpolymer such as butyl polymer is not desirable because it makes the even dispersion of fillers and curatives normally used during vulcanization difficult. This increases the likelihood of under- and over-cured areas within the rubbery article, rendering its physical properties inferior and unpredictable.

These examples show that reduction of cold flow can be achieved by increasing long chain branching via the use of a multifunctional monomer. However, it has a negative impact on other aspects of processability, and formation of gel during polymerization is possible. High gel content results in inferior product properties. In some instances the use of a multifunctional polymer is cited as a method which is not preferred. For example, British patent 1,143,690 teaches that reduction of cold flow by the use of chemical crosslinking agents having polyfunctional groups inevitably results in the deterioration of the performance of the rubbery product and, sometimes, a considerable reduction in their processability. This is supported by a comparative example where DVB was used. The product obtained with DVB showed improved cold flow but its mill processability decreased significantly.

U.S. Pat. No. 5,071,913 [Powers et al. (Powers)] teaches that a good balance of processing characteristics (low cold flow and high extrusion rate) can be achieved by the addition of an effective amount of a functional reagent to the polymerization mixture. The functional reagent is selected from the group consisting of polymers and copolymers comprising functional groups capable of copolymerizing or forming a chemical bond with the product polymer—see column 16, line 24 to column 17, line 19 of Powers. Powers mentions the prior art related to DVB-modified butyl rubber and characterizes the prior art as deficient since it relates to polymers having a high gel content in the polymer product. Powers particularly prefers, as the functional reagent, such cationically active agents which do not contain active branching (crosslinking) functionality—i.e., the growing butyl chain can not propagate further if attached to the reactive site of the additive—column 15, lines 14–21. Indeed, Powers does not teach or suggest the use of a crosslinking agent during production of the butyl polymer and gives preference in the Examples to polymeric modifiers which tend to terminate the chain after attachment.

Despite the advances made in the art, there is an ongoing need for a butyl rubber which has an improved balance of (lower) cold flow, (higher) green strength, (faster) filler incorporation, (higher degree) of filler dispersion, (higher) stress relaxation rate and (lower) melt viscosity at high shear rates.

It is an object of the present invention to obviate or mitigate at least one of the above-mentioned disadvantages of the prior art.

It is another object of the present invention to provide a novel butyl polymer.

It is an additional object of the present invention to provide a novel process for producing a butyl polymer.

It is yet another objective of the present invention to provide a method for the prevention of gel formation when multifunctional crosslinking agents are used in the polymerization.

It is a further object of the present invention to provide a method for the purposeful alteration of the rheological properties of butyl polymer in order to achieve optimum performance in a given set of processing equipment.

SUMMARY OF THE INVENTION

Accordingly, in one of its aspects, the present invention provides a butyl polymer having improved processability, the butyl polymer being derived from a reaction mixture comprising:
 (i) a monomer mixture comprising a $C_4$ to $C_7$ monoolefin monomer and a $C_4$ to $C_{14}$ multiolefin monomer or β-pinene;
 (ii) a multiolefin cross-linking agent; and
 (iii) a chain transfer agent.

In another of its aspects the present invention provides a process for preparing a butyl polymer having improved processability, the process comprising the steps of contacting a reaction mixture comprising:
 (a) a monomer mixture comprising a $C_4$ to $C_7$ monoolefin monomer and a $C_4$ to $C_{14}$ multiolefin monomer or β-pinene;
 (b) a multiolefin cross-liking agent;
 (c) a chain transfer agent; and
 (d) a catalyst system.

DETAILED DESCRIPTION OF THE INVENTION

Figure 1:
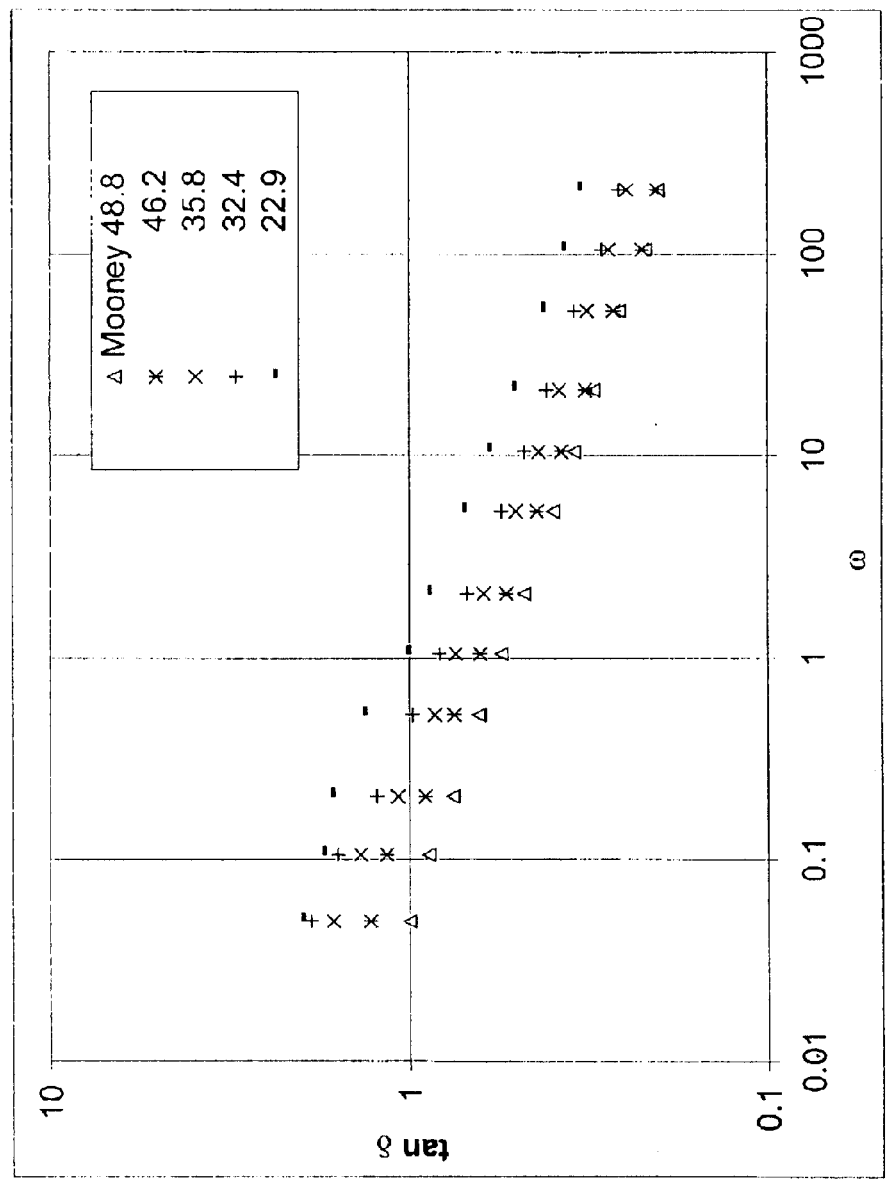
FIG. 1 is a double logarithmic plot showing the tangent delta as a function of the angular frequency of conventional butyl polymers with different Mooney viscosity.

Thus, the present invention relates to butyl rubber polymers. The terms "butyl rubber", "butyl polymer" and "butyl rubber polymer" are used throughout this specification interchangeably and each is intended to denote polymers prepared by reacting a monomer mixture comprising a $C_4$ to $C_7$ monoolefin monomer and a $C_4$ to $C_{14}$ multiolefin monomer or β-pinene. The butyl polymer may be halogenated or non-halogenated. Further, the monomer mixture may contain small amounts of one or more polymerizable co-monomers.

It has been surprisingly and unexpectedly discovered that a butyl rubber having an improved balance of green strength, filler incorporation and stress relaxation rate can be obtained by adding to the monomer mixture a multiolefin cross-linking agent and a chain transfer agent. The resulting butyl polymer has overall improved processability. More specifically, such butyl polymers have a highly desirable combination of rheological properties. On the one hand, the viscosity and elasticity of the butyl polymer at very low shear rates is higher than that of a comparable copolymer of an isoolefin and a conjugated diene, rendering the present butyl polymer more resistant to cold flow. On the other hand, the viscosity and elasticity of the butyl polymer at high shear rates is lower than that of a comparable copolymer of an isoolefin and a conjugated diene, resulting in improved mixing properties, higher extrusion rate and reduced die swell for the present butyl polymer. These improved properties are believed to result from the combination of the monomer mixture, the multiolefin cross-linking agent and the chain transfer agent.

Thus, the present invention provides a means to purposefully alter the rheological properties of polymers. It has been discovered that this may be achieved by the amount of crosslinking agent added to the process, and by the control of the intensity of the chain transfer reaction. The latter can be achieved by the addition of chain transfer agent in the desired concentration, or by changing the polymerization temperature. It is known that chain transfer in cationic polymerization processes is strongly influenced by temperature.

The careful balancing of the crosslinking and chain transfer reactions permits the alteration of the of the slope of logarithm tangent delta—logarithm frequency curve. The decrease in slope implies an improved processability characteristic over the conventional linear polymers provided that:

1. the tangent delta at high frequencies is higher than that of the linear polymers,
2. the tangent delta at low frequencies is lower than that of the linear polymers, and
3. the product obtained is suitable for compounding and curing—i.e., it has sufficient molecular weight or elasticity for conventional rubber-handling operations.

The first two points imply that logarithm tangent delta-logarithm frequency curves of a linear polymer and of a polymer with branched chains has to have a crossover point.

It has been found that these features can be achieved in the present butyl polymer. Butyl polymers having widely different tangent delta-frequency relationships can be produced. The crossover point between the tangent delta curve of the linear polymer and the near-gel point polymer can be shifted. In the extreme, gel free polymers with frequency-independent tangent delta can be made and the tangent delta value can be changed by the control of the polymerization reaction. The polymers obtained can be processed, compounded and cured by conventional methods and they display a significantly improved processability.

Thus, the present butyl polymer is derived from, and the present process relates to, the use of a monomer mixture comprising a $C_4$ to $C_7$ monoolefin monomer and a $C_4$ to $C_{14}$ multiolefin monomer or β-pinene.

Preferably, the monomer mixture comprises from about 80% to about 99% by weight of a $C_4$ to $C_7$ monoolefin monomer and from about 1.0% to about 20% by weight of a $C_4$ to $C_{14}$ multiolefin monomer or β-pinene. More preferably, the monomer mixture comprises from about 85% to about 99% by weight of a $C_4$ to $C_7$ monoolefin monomer and from about 1.0% to about 10% by weight of a $C_4$ to $C_{14}$ multiolefin monomer or β-pinene. Most preferably, the monomer mixture comprises from about 95% to about 99% by weight of a $C_4$ to $C_7$ monoolefin monomer and from about 1.0% to about 5.0% by weight of a $C_4$ to $C_{14}$ multiolefin monomer or β-pinene.

The preferred $C_4$ to $C_7$ monoolefin monomer may be selected from the group comprising isobutylene, 2-methyl-1-butene, 3-methyl-1-butene, 2-methyl-2-butene, 4-methyl-1-pentene and mixtures thereof. The most preferred $C_4$ to $C_7$ monoolefin monomer comprises isobutylene.

The preferred $C_4$ to $C_{14}$ multiolefin monomer may be selected from the group comprising isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof. The most preferred $C_4$ to $C_{14}$ multiolefin monomer comprises isoprene.

As discussed above, the monomer mixture may contain minor amounts of one or more additional polymerizable co-monomers. For example, the monomer mixture may contain a small amount of a styrenic monomer.

The preferred styrenic monomer may be selected from the group comprising p-methylstyrene, styrene, α-methylstyrene, p-chlorostyrene, p-methoxystyrene, indene (including indene derivatives) and mixtures thereof. The most preferred styrenic monomer may be selected from the group comprising styrene, p-methylstyrene and mixtures thereof.

If present, it is preferred to use the styrenic monomer in an amount of up to about 5.0% by weight of the monomer mixture.

The use of other monomers in the monomer mixture is possible provided, of course, that they are copolymerizable with the other monomers in the monomer mixture.

As stated hereinabove, the butyl polymer may be halogenated. Preferably, the halogenated butyl polymer is brominated or chlorinated. Preferably, the amount of halogen is in the range of from about 0.1 to about 8%, more preferably from about 0.5% to about 4%, most preferably from about 1.0% to about 3.0%, by weight of the polymer.

The halogenated butyl polymer may also be produced by halogenating a previously-produced butyl polymer derived from the monomer mixture described hereinabove.

The reaction mixture used to produce the present butyl polymer further comprises a multiolefin cross-linking agent. The choice of the cross-linking agent is not particularly restricted. Preferably, the cross-linking comprises a multi-olefinic hydrocarbon compound. Examples of these are norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is selected from the group comprising divinyl-benzene, diisopropenylbenzene, divinyltoluene, divinyl-xylene and $C_1$ to $C_{20}$ alkyl substituted derivatives thereof. Most preferably the multiolefin crosslinking agent comprises divinyl-benzene and diisopropenylbenzene.

The amount of crosslinking agent used in the reaction mixture depends upon the type of multifunctional crosslinking agent employed. For example, in the case of DVB, the amount of DVB can range from 0.01 to 3 weight % (where weight percent is defined as DVB/(IB+IP+DVB)*100). The preferred range is 0.05 to 1 weight %, the most preferred is 0.1 to 0.4 weight %.

The reaction mixture used to produce the present butyl polymer further comprises a chain transfer agent.

The chain transfer agent should preferably be a strong chain transfer agent—i.e., it should be capable of reacting with the growing polymer chain, terminate its further growth and subsequently initiate a new polymer chain. The type and amount of chain transfer agent is dependent upon the amount of crosslinking agent. At low concentrations of crosslinking agent low amounts of chain transfer agent and/or a weak chain transfer agent can be employed. As the concentration of the crosslinking agent is increased, however, the chain transfer agent concentration should be increased and/or a stronger chain transfer agent should be selected.

Use of a weak chain transfer agent should be avoided because too much can decrease the polarity of the solvent mixture and also would make the process uneconomical.

The strength of the chain transfer agent may be determined conventionally—see, for example, J. Macromol. Sci.-Chem., Al(6) pp. 995–1004 (1967) [Kennedy et al.]. A number called the transfer constant expresses its strength. According to the values published in this paper, the transfer constant of 1-butene (used in Exxon's DVB patents) is 0.

Preferably, the chain transfer agent has a transfer coefficient of at least about 10, more preferably at least about 50. Non-limiting examples of useful chain transfer agents are piperylene, 1-methylcycloheptene, 1-methyl-cyclopentene, 2-ethyl-1-hexene, 2,4,4-trimethyl-1-pentene, indene and mixtures thereof. The most preferred chain transfer agent is 2,4,4-trimethyl-1-pentene.

The amount of chain transfer agent employed depends upon the amount and type of the multifunctional crosslinking agent used. In the case of DVB and 2,4,4-trimethyl-1-pentene (TMP-1) the preferred range is 0.01 to 1.4 weight %, based on the amount of isobutylene used (TMP-1/IB*100). More preferred is 0.05 to 0.5 weight %.

The present process comprises contacting the reaction mixture described above with a catalyst system.

Preferably, the process for producing the butyl polymer is conducted at a temperature conventional in the production of butyl polymers—e.g., in the range of from about –100° C. to about +50° C. The butyl polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23; Editors Elvers et al.).

As an example, in one embodiment the process is conducted in the presence of an aliphatic hydrocarbon diluent (such as n-hexane) and a catalyst mixture comprising a major amount (from about 80 to about 99 mole percent) of a dialkylaluminum halide (for example diethylaluminum chloride), a minor amount (from about 1 to about 20 mole percent) of a monoalkylaluminum dihalide (for example isobutylaluminum dichloride), and a minor amount (from about 0.01 to about 10 ppm) of at least one of a member selected from the group comprising water, aluminoxane (for example methylaluminoxane) and mixtures thereof.

Of course, other catalyst systems conventionally used to produce butyl polymers can be used to produce a butyl polymer which is useful herein—see, for example, "Cationic Polymerization of Olefins: A Critical Inventory" by Joseph P Kennedy (John Wiley & Sons, Inc. © 1975).

If it is desired to produce a halogenated butyl polymer, the butyl polymer prepared according to the above process may be halogenated in a conventional manner. See, for example, U.S. Pat. No. 5,886,106. Thus, the halogenated butyl rubber may be produced either by treating finely divided butyl rubber with a halogenating agent such as chlorine or bromine, or by producing brominated butyl rubber by the intensive mixing, in a mixing apparatus, of brominating agents such as N-bromosuccinimide with a previously made butyl rubber. Alternatively, the halogenated butyl rubber may be produced by treating a solution or a dispersion in a suitable organic solvent of a previously made butyl rubber with corresponding brominating agents. See, for more detail, Ullmann's Encyclopedia of Industrial Chemistry (Fifth, Completely Revised Edition, Volume A23; Editors Elvers et al.). The amount of halogenation during this procedure may be controlled so that the final terpolymer has the preferred amounts of halogen described hereinabove.

The butyl rubbers may be used for the production of vulcanized rubber products. For example, useful vulcanizates may be produced by mixing the butyl rubber with carbon black, silica and/or other known ingredients (e.g., other fillers, other additives, etc.) and crosslinking the mixture with a conventional curing agent in a conventional manner. Vulcanizates of halogenated butyl rubber may be similarly prepared.

Embodiments of the present invention will be illustrated with reference to the following Examples, which should not be use to construe or limit the scope of the present invention.

EXAMPLE 1

This is a comparative example. All polymers are linear and were made in the absence of DVB. The purpose of this example is to show the effect of the molecular weight on the rheological properties. Molecular weight was adjusted by the addition of small amounts of chain transfer agent (2,4,4-trimethyl-pentene (TMP-1)).

A series of batch experiments were carried out using 71.5 g isobutylene, 2.04 g isoprene and 879.2 g methyl chloride in a 2000 mL glass reaction flask equipped with a high speed marine-type impeller. To the first batch, no chain transfer agent was added. To the rest, increasing amounts of diisobutylene (2,4,4-trimethyl-1-pentene) (TMP-1) were added, as specified in Table 1. The reaction mixture was cooled to −93° C. and polymerization was initiated by the addition of a solution of aluminum trichloride in methyl chloride. After 5 minutes the reaction was terminated by the addition of 10 mL of ethanol. The resulting polymer was dissolved in hexane, stabilized by the addition 0.2 phr Irganox-1010™ and coagulated in hot water. Residual moisture and monomer were removed by drying samples on a hot mill at 140° C. Results are shown in Table 1.

TABLE 1

| | Experiment No. | | | | |
|---|---|---|---|---|---|
| | 1 | 2 | 3 | 4 | 5 |
| TMP-1 (g) | 0 | 0.035 | 0.071 | 0.14 | 0.21 |
| AlCl$_3$ (mg) | 43 | 42 | 43 | 43 | 42 |
| Catalyst Efficiency (g. polym./g. cat.) | 1350 | 1280 | 1360 | 1350 | 1430 |
| Conversion (wt %) | 79.0 | 73.0 | 79.2 | 78.9 | 81.4 |
| Mooney (1 + 8 @ 125° C.) | 48.8 | 46.2 | 35.8 | 32.4 | 22.9 |
| Mooney relaxation (area under curve) | 761 | 259 | 117 | 74 | 22 |

Mooney and Mooney relaxation were measured at 125° C. Relaxation time was set at eight minutes. Mooney values, as well as the area under the curve registered during relaxation, are listed in Table 1. The results clearly show that TMP-1 is an effective chain transfer agent. Mooney decreased from about 49 to about 23 as the amount of TMP-1 was increased from 0 to 0.21 g in the charge. Results also show that the chain transfer agent had no effect on the conversion or catalyst efficiency.

As Mooney decreases the area under curve also decreases, indicating an increasing ability of the sample to relax or flow under stress. This was confirmed by dynamic mechanical testing. Dynamic properties of the samples were determined using an RPA 2000 rubber processability analyzer made by Alpha Technology. Measurements were carried out at 125° C. using 0.72 degree arc in the 0.05—209 rad/s angular frequency range.

Log tan δ–log ω curves (FIG. 1) are shifted downward as Mooney decreases. There is no crossover point, and there is a slight change in slope due to the difference in MWD.

Figure 2:
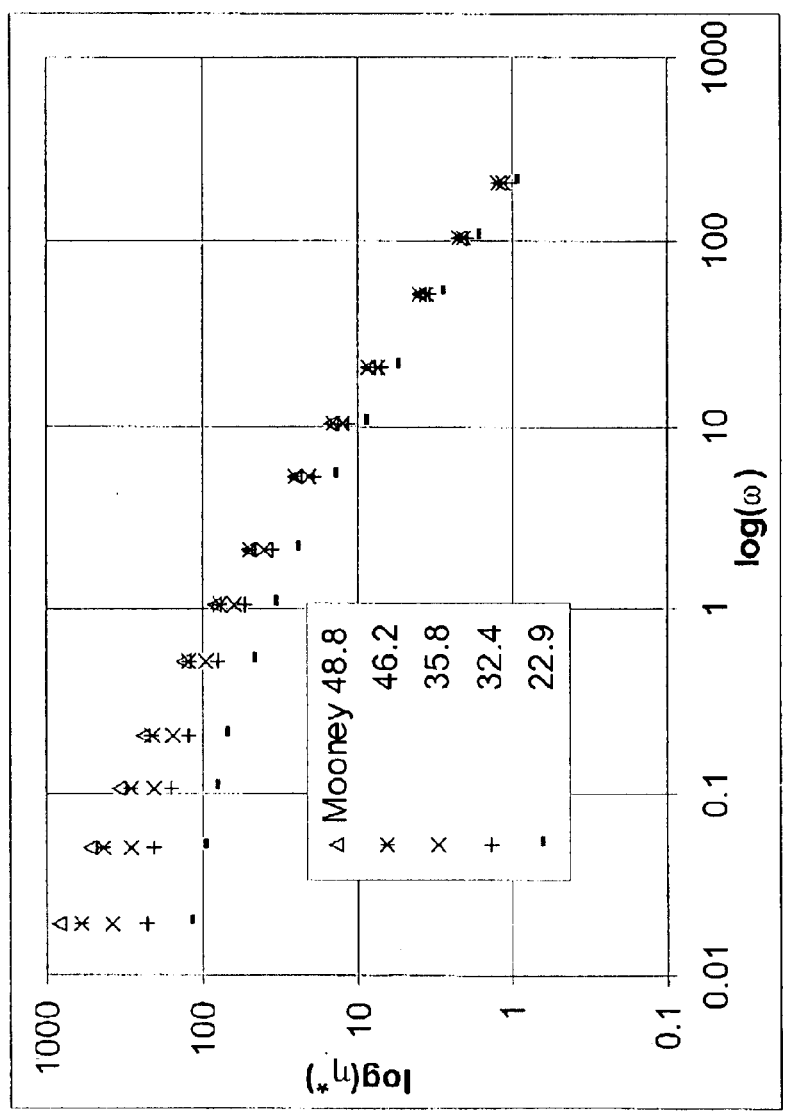
FIG. 2 is a double logarithmic plot showing the complex viscosity as function of the angular frequency of conventional butyl polymers with different Mooney viscosity.

Log η–log ω curves (FIG. 2) show the transition to the Newtonian region at low frequencies. Shear thinning is apparent. The transition from Newtonian to Shear thinning shifts to higher frequencies as Mooney decreases.

EXAMPLE 2

This Example illustrates how the solubility of a DVB cross-linked polymer can be increased by the addition of strong chain transfer agents to the polymerization mixture and still obtain polymers with sufficiently high viscosity.

A series of batch experiments were carried out using 146.6 g isobutylene, 4.15 g isoprene, 4.20 g DVB (81 wt % pure) and 879.2 g methyl chloride in a 2000 mL glass reaction flask equipped with a high speed marine-type impeller. The DVB used in this Example (and in subsequent Examples), was a mixture of divinylbenzene and ethylvinylbenzene. The composition of the mixture was measured to be 57 wt % meta-divinylbenzene (m-DVB), 24 wt % para-divinylbenzene (p-DVB), 9.9 wt % meta-ethylvinylbenzene and 9.1 wt % para-ethylvinylbenzene.

To the first batch, no chain transfer agent was added. To the rest, increasing amounts of diisobutylene (2,4,4-trimethyl-1-pentene) (TMP-1) were added as specified in the table. The reaction mixture was cooled to −92° C. and the polymerization initiated by the addition of 15 mL of a saturated solution of aluminum chloride in methyl chloride. After 4 minutes the reaction was terminated by the addition of 10 mL of ethanol.

TABLE 2

| | Experiment No. | | | | | | Control (no DVB) |
|---|---|---|---|---|---|---|---|
| | 6 | 7 | 8 | 9 | 10 | 11 | |
| TMP-1 (g) | 0 | 0.20 | 0.40 | 0.81 | 1.63 | 2.05 | — |
| Conversion (wt %) | 94.1 | 82.8 | 79.4 | 70.6 | 78.3 | 82.0 | 80.9 |
| Solubility (wt %) | 27 | 28.7 | 39.5 | 68.7 | 75.6 | 100 | 100 |
| Mooney (1 + 8 @ 125° C.) | 43.6 | 44.1 | 40.5 | 47.5 | 26.4 | 17.6 | 36.5 |
| Mooney relaxation (area under curve) | 3150 | 3620 | 2840 | 3580 | 1420 | 915 | 1090 |

The resulting polymer was dissolved in hexane, stabilized by the addition 0.2 phr Irganox-1010™ and coagulated in hot water. Residual moisture and monomer were removed by drying the samples on a hot mill at 140° C.

In these experiments the amount of m-DVB and p-DVB in the monomer feed was 2.20 wt %. According to the prior art (Welch #2), at this concentration of DVB a substantially insoluble interpolymer should be obtained. Indeed the solubility in the absence of the chain transfer agent was low: only 27 weight %. However, by the introduction of the strong chain transfer agent, solubility was increased from 27 weight % to 100 weight %.

The Mooney viscosity of the polymer samples obtained in this Example decreased from about 44 to about 18 with increasing solubility. However, even at the highest chain transfer agent concentration an elastic material was obtained which was suitable for compounding and curing.

Figure 3:
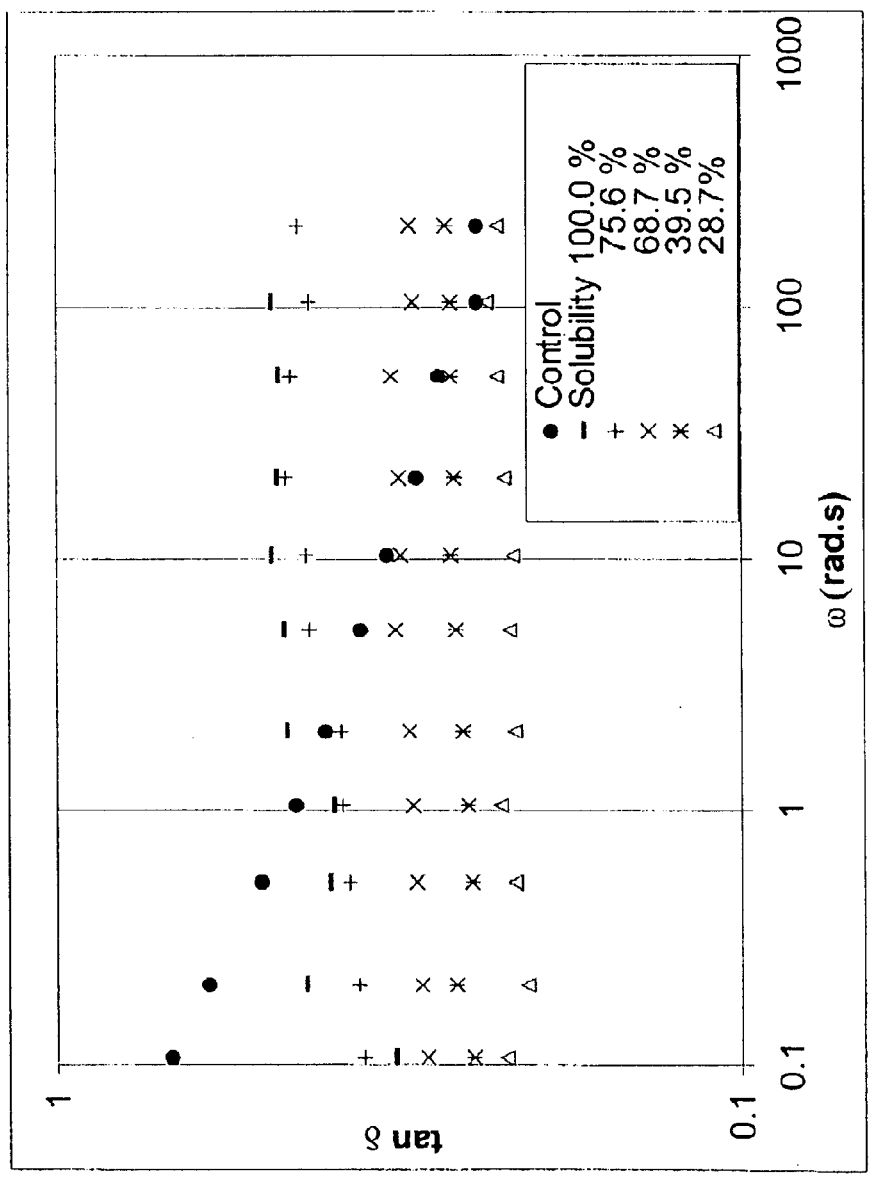
FIG. 3 is a double logarithmic plot showing the tangent delta as a function of the angular frequency of polymers of different solubility in the presence of DVB and different amounts of chain transfer agent.
Figure 4:
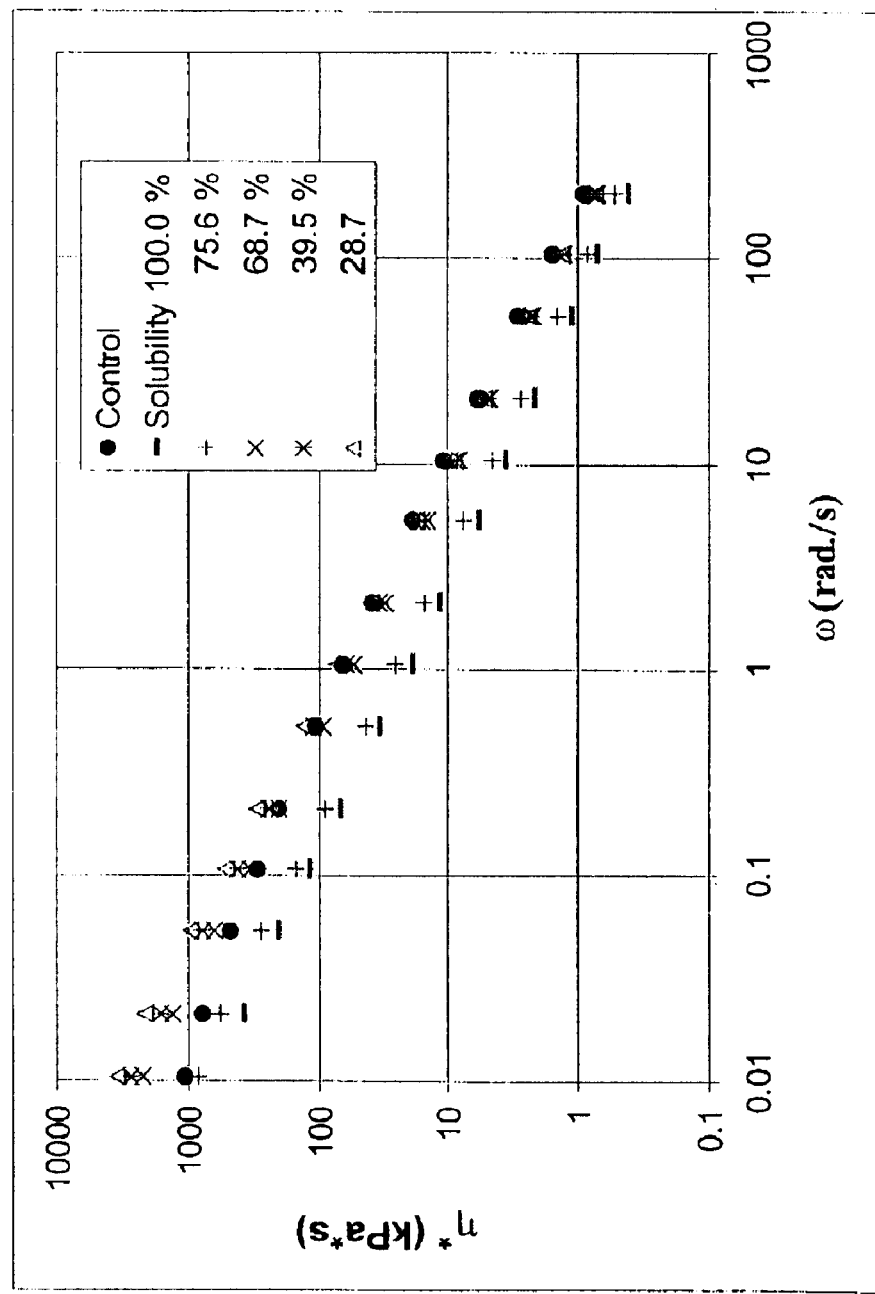
FIG. 4 is a double logarithmic plot showing the complex viscosity as function of the angular frequency of polymers of different solubility made in the presence of DVB and different amounts of chain transfer agent.

Dynamic properties of the samples were determined as described in Example 1. The effect of increasing chain transfer agent on the dynamic properties of the resulting polymer is illustrated by FIGS. 3. and 4. For comparison purposes, the control sample prepared in the absence of DVB or DMP was included in these Figures. The change in the dynamic properties is dramatic. All samples have a frequency independent tangent delta. As the amount of chain transfer agent was increased the tangent delta shifted to higher values. At high gel content (27% solubility), the tangent delta remained below the tangent delta of the linear control sample at all frequencies. As solubility increased tangent delta increased and the curve crossed over the tangent delta of the linear sample. All samples showed a tangent delta lower than that of the linear control polymer at very low frequencies. Most importantly, the two samples (sample 5 and 6), which had significantly lower Mooney viscosity (26.4 and 17.6) compared to the linear control sample (Mooney 36.5) also showed tangent delta values lower than that of the control. Based on this result, a significant reduction in cold flow is expected.

While not wishing to be bound by any particular theory or mode of action, it is believed that the frequency independent tangent delta is achieved by producing an elastomer which is close to its gel point. A polymer at its gel point is in a transition state between liquid and solid. (H. H. Winter: Gel Point, Encyclopedia of Polymer Science and Engineering, John Wiley & Sons, Supplement Volume, p. 343). The molecular weight distribution of such a polymer is very broad, and molecules range from the smallest unreacted oligomers to the infinite cluster. It is predicted by theory that the loss tangent (tan delta=G"/G') of the polymer at its gel point is independent of the frequency of the dynamic experiment.

An additional important feature of the DVB-modified samples is that their complex viscosity does not show a transition toward Newtonian behavior at low frequencies. It appears that it follows a power law behavior in the whole frequency range. All samples have a lower complex viscosity at frequencies exceeding about 10 rad/s. On the other hand at lower frequencies they have a higher complex viscosity than that of the control, indicating higher resistance to flow.

The complex viscosity obtained from dynamic testing can be used to predict the apparent viscosity of sample in capillary flow according to the Cox-Merz rule (W. P. Cox and E. H. Merz: J. Polymer Sci, Vol 28, p 619 (1958)). The Cox-Merz rule states that the complex viscosity at a given angular frequency is equal to the apparent viscosity measured under steady shear rate in a capillary viscometer. This has been confirmed very recently by measuring the viscosity of different elastomers using RPA and MPT (Monsanto Processability Tester) (J. S. Dick: Comparison of shear thinning behavior of different elastomers using capillary and rotorless shear rheometry, Paper No. 50, ACS Rubber Division Meeting Dallas, Tex., Apr. 4–6, 2000.)

Mooney stress relaxation measurements were also conducted using these samples to determine the ability of the samples to resist cold flow by an independent method. The selected relaxation time was eight minutes. The area under the torque-time curve was used to compare the samples. Table 2 shows the results. All DVB modified samples except the very low Mooney one (Mooney 17.6) has a higher area under curve value than the linear control sample of this example or any linear samples produced in Example 1. Even the 17.6 Mooney sample has very similar area under curve value to that of the linear control. The higher are under curve indicates a higher ability of the sample to resist flow under low shear rates, i.e., to resist cold flow.

EXAMPLE 3

This example shows the effect of different degrees of branching on dynamic properties.

A series of batch experiments were carried out using 71.5 g isobutylene, 2.04 g isoprene, and 1008 g methylchloride in a 2000 ml glass reaction flask equipped with a high speed marine-type impeller. The amount of DVB and TMP-1 added to the reaction mixture is specified in Table 2. The reaction mixture was cooled to −92° C. and the polymerization initiated by the addition of an approximately 0.30 weight % solution of aluminum chloride in methyl chloride. After 8 minutes, the reaction was terminated by the addition of 10 mL of ethanol. Experimental results are listed in Table 3.

TABLE 3

| | Experiment No. | | | | | | |
|---|---|---|---|---|---|---|---|
| | 12 | 13 | 14 | 15 | 16 | 17 | 18 |
| DVB (g) | 1.37 | 1.10 | 0.82 | 0.55 | 0.27 | 0 | 0 |
| TMP-1 (g) | 0.99 | 0.79 | 0.59 | 0.40 | 0.20 | 0 | 0.07 |
| AlCl$_3$ (mg) | 50 | 48 | 47 | 37 | 36 | 47 | 43 |
| Catalyst Efficiency (g. polym./g. cat.) | 1140 | 1120 | 1250 | 1610 | 1650 | 1280 | 1360 |
| Conversion (wt %) | 75.4 | 71.4 | 78.6 | 79.9 | 80.5 | 81.5 | 79.2 |
| Solubility (wt %) | 102.0 | 101.0 | 101.0 | 101.0 | 101.0 | 100 | 100 |

TABLE 3-continued

|  | Experiment No. | | | | | | |
| --- | --- | --- | --- | --- | --- | --- | --- |
|  | 12 | 13 | 14 | 15 | 16 | 17 | 18 |
| Mooney (1 + 8 @ 125° C.) | 20.2 | 29.7 | 34.5 | 36.8 | 45.8 | 51.3 | 35.8 |
| Mooney relaxation (area under curve) | 670 | 1190 | 1590 | 1510 | 1680 | 1090 | 117 |

In addition to DVB modified samples, two control samples were also prepared in the absence of DVB. All samples were completely soluble in hexane. Mooney and Mooney relaxation measurements clearly show that the DVB modified samples can resist significantly better cold flow than the linear ones. Only the very low molecular weight DVB modified sample (Mooney viscosity 20.2) showed lower area under the relaxation curve than the significantly higher molecular weight (Mooney viscosity 51.3) linear sample.

Figure 5:
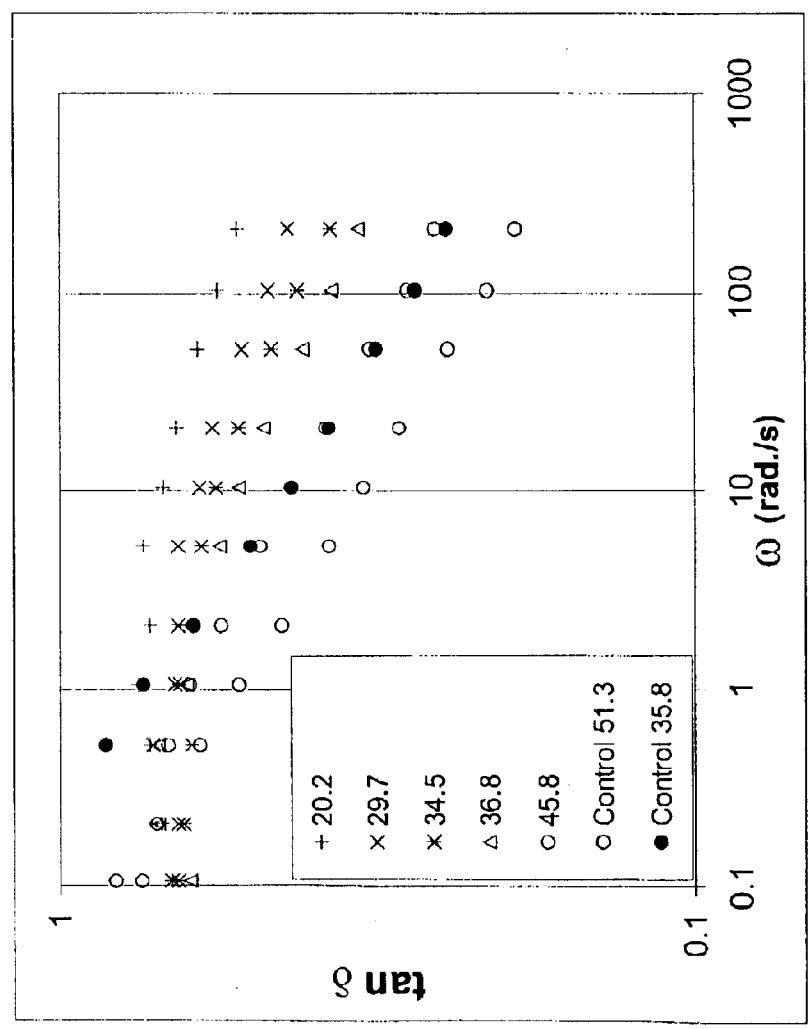
FIG. 5 is a double logarithmic plot showing the tangent delta as a function of the angular frequency of completely soluble polymers made in the presence of different amounts of DVB and chain transfer agent.
Figure 6:
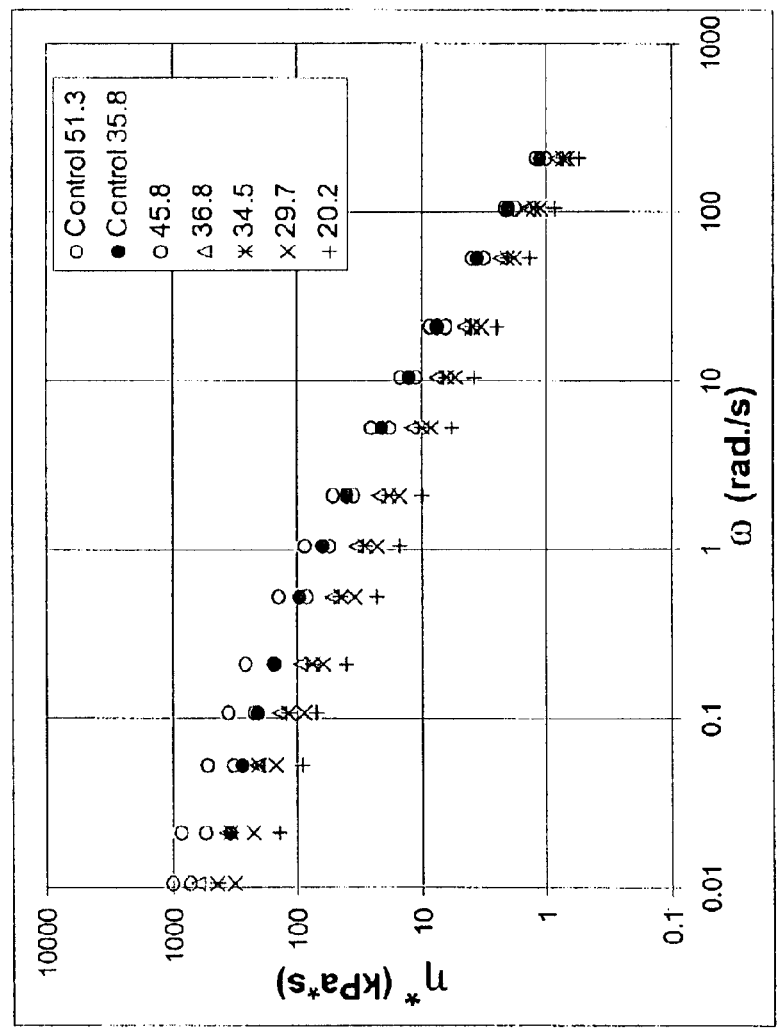
FIG. 6 is a double logarithmic plot showing the complex viscosity as function of the angular frequency of completely soluble polymers made in the presence of different amounts of DVB and chain transfer agent.

FIGS. 5. And 6 show the results of dynamic testing. Tangent delta of the DVB modified samples was measured to be lower at low frequencies (1 rad/s or below) than that of the linear samples. This confirms the results of the Mooney relaxation measurements, i.e., they are able to resist cold flow more than the linear samples.

All DVB modified samples showed a cross over point with the tangent delta-frequency curve of the two control samples. At frequencies higher than about 1 rad/s, all DVB modified samples displayed a higher tangent delta. This indicates that at higher shear rates these samples will have less elasticity. Lower elasticity at higher shear rates is preferred in order to obtain a material which is less nervy or swells less as it exits the die of an extruder.

EXAMPLE 4

In this example samples were prepared using a low and constant DVB concentration, varying the diisobutylene concentration in order to prepare samples having identical degrees of branching but different Mooney viscosity. Experimental conditions were identical to that of the previous examples. Experimental results are listed in Table 4.

TABLE 4

|  | Experiment No. | | | | |
| --- | --- | --- | --- | --- | --- |
|  | 19 | 20 | 21 | 22 | 23 |
| DVB (g) | .27 | .27 | .27 | .27 | .27 |
| TMP-1 (g) | 0.14 | .21 | 0.28 | 0.35 | 0.43 |
| AlCl$_3$ (mg) | 71 | 60 | 72 | 68 | 71 |
| Catalyst Efficiency (g. polym./g. cat.) | 880 | 1020 | 870 | 960 | 860 |
| Conversion (wt %) | 84.1 | 82.4 | 84.1 | 87.7 | 82.2 |
| Solubility (wt %) | 100 | 100 | 100 | 100 | 100 |
| Mooney (1 + 8 @ 125° C.) | 51.9 | 36.9 | 28.1 | 19.1 | 16.6 |
| Mooney relaxation (area under curve) | 2478 | 1319 | 609 | 95 | 30 |

According to the Mooney relaxation measurements, samples prepared at this low concentration of DVB are still able to resist cold flow better than comparable or even higher Mooney linear samples. For example, the 28.1 Mooney sample of this example (Experiment No. 21) has an area under curve value of 609. In contrast, the 32.4, 35.8 and even the 46.2 Mooney linear samples of Example 1 have a lower are under curve value (see Table 1.).

Samples of example 4, as well as the linear samples listed in Example 1, were compounded with 60 phr N660 black to determine mixing behavior and to asses the effect of the filler on the rheological properties. Results of a series of such tests are shown in tables 5 and 6, below.

TABLE 5

Select Properties of Linear Compounded Samples

|  | Experiment No. | | | | |
| --- | --- | --- | --- | --- | --- |
|  | 1 | 2 | 3 | 4 | 5 |
| Mooney (1 + 8 @ 125° C.) | 48.8 | 46.2 | 35.8 | 32.4 | 22.9 |
| Maximum temp. during mixing (C.) | 81.3 | 85.6 | 79.7 | 81.3 | 79.5 |
| Maximum torque during mixing | 34.3 | 34.2 | 33.3 | 30.6 | 30.8 |
| Sum of torque | 5040 | 6390 | 5080 | 5460 | 5200 |
| Running Die Swell (1000 1/s, 1/D = 1) | 104.5 | 85.8 | 83.8 | 76.2 | 63.7 |
| Relaxed Die Swell (1000 1/s, 1/D = 1) | 122.3 | 101.4 | 100 | 85.1 | 71.6 |
| Viscosity @ 1000 1/s (kPa * s) | 3.48 | 2.84 | 2.65 | 2.31 | 1.84 |
| Cold Flow by DEFO (remaining height after 30 min (mm)) | 11.7 | 11.3 | 10.9 | 10.7 | 10.5 |

TABLE 6

Select Properties of DVB-Modified Compounded Samples

| | Experiment No. | | | | |
|---|---|---|---|---|---|
| | 19 | 20 | 21 | 22 | 23 |
| Mooney (1 + 8 @ 125° C.) | 51.9 | 36.9 | 28.1 | 19.1 | 16.6 |
| Maximum temp. during mixing (C.) | 88.9 | 85.2 | 84 | 80.3 | 78.7 |
| Maximum torque during mixing | 39 | 40.9 | 36.2 | 36.1 | 37.4 |
| Sum of torque | 7510 | 6600 | 6360 | 5660 | 5640 |
| Running Die Swell (1000 1/s, 1/D = 1) | 80.8 | 74.2 | 68.1 | 64.8 | 55.9 |
| Relaxed Die Swell (1000 1/s, 1/D = 1) | 92.2 | 89.2 | 79.2 | 77.7 | 67.2 |
| Viscosity @ 1000 1/s (kPa * s) | 3.17 | 2.68 | 2.39 | 2.12 | 1.86 |
| Cold Flow by DEFO (remaining height after 30 min (mm)) | 11.9 | 11.3 | 10.8 | 10.2 | 9.6 |

Figure 7:
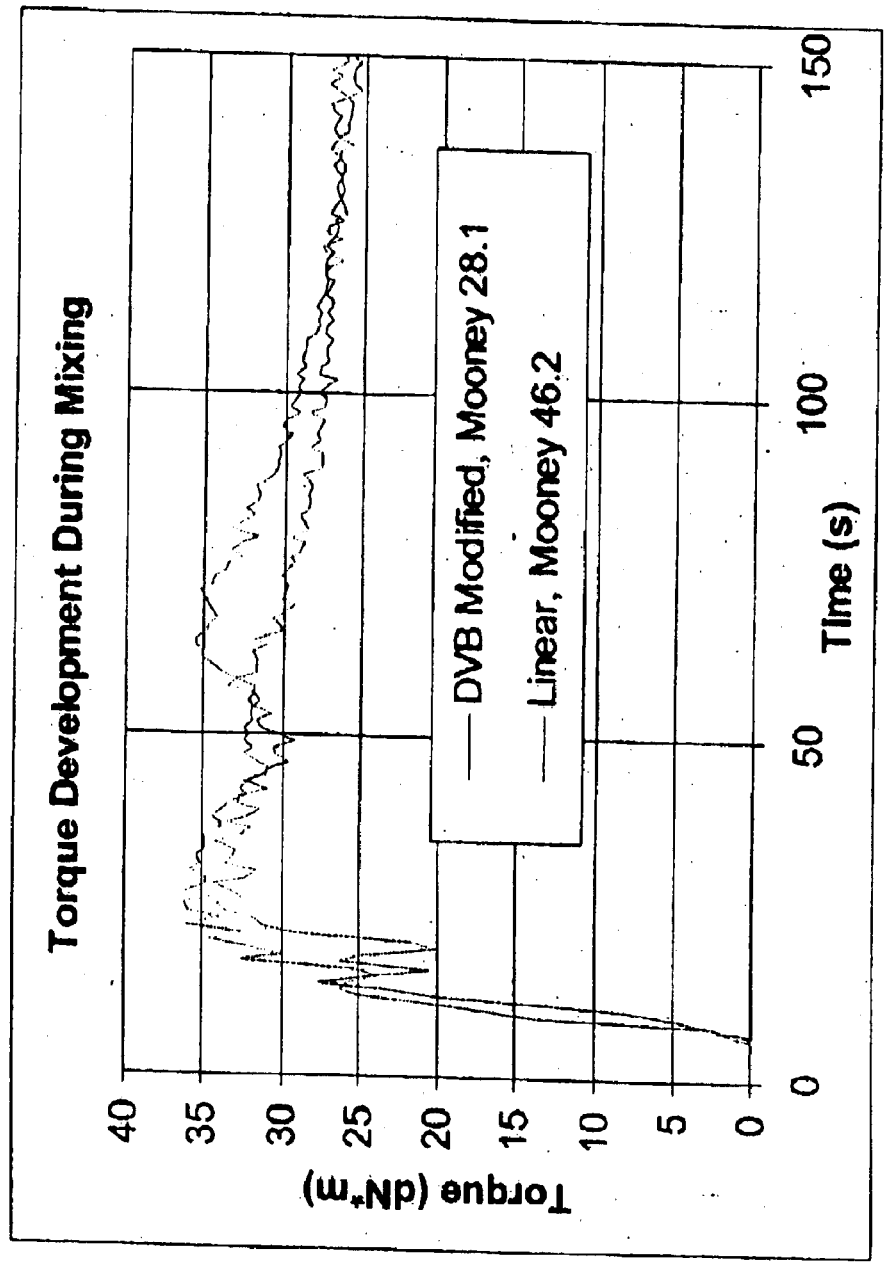
FIG. 7 is a plot of torque as function of time showing the torque development of conventional linear and a DVB branched butyl sample during their mixing with carbon black.
Figure 8:
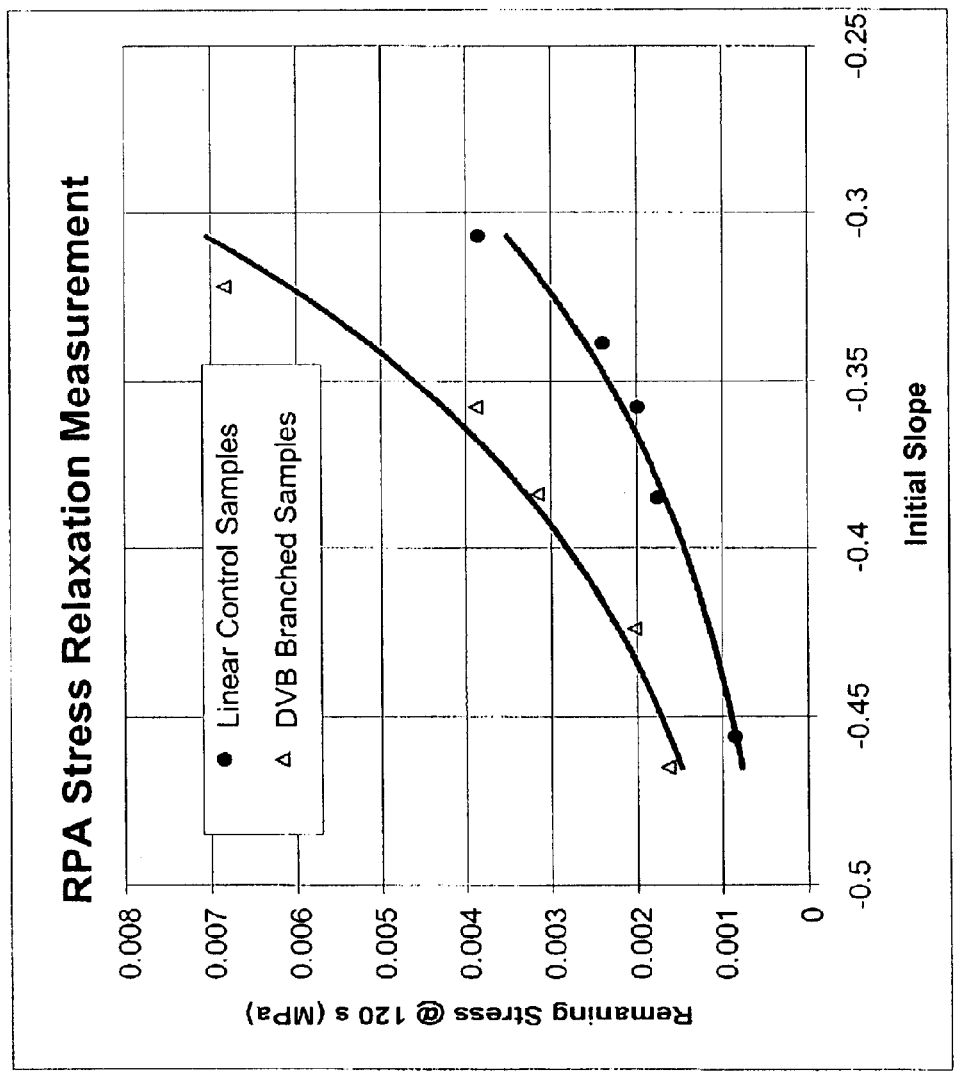
FIG. 8 is a plot showing the remaining stress at 120 s as a function of initial slope of black filled linear and branched samples.

As can be seen from the above tables, the mixing behavior of the DVB modified samples is improved. They have higher torque development at similar or even lower raw polymer Mooney. They also show a distinctive second maximum of the torque curve (see FIG. 7). This is an indication of improved filler dispersion. Butyl rubber is known to mix with black poorly. It does not show a distinctive second torque peak.

The ability of the compounded samples to relax under stress was determined using the stress relaxation program of the RPA 2000 (Rubber Process Analyzer) instrument. During this measurement a constant strain is applied to the sample by the rapid movement of the lower die and the stress is measured at the upper die as a function of time. This measurement is similar to the Mooney relaxation measurement in principle. Therefore, stresses detected at longer times can be used to characterize the ability of a sample to resist cold flow. A higher remaining stress is an indication of higher resistance to cold flow. The remaining stress at two minutes was selected for the characterization of the cold flow resistance of the samples.

The initial rate of stress decay enables one to determine the sample ability to relax when it is exposed to a large strain for a very short period of time. An example of this is the extrusion of rubber or its compound through a short and narrow die at a high shear rate. As the rubber enters the die, it is exposed to a high strain for a short period of time. The initial stress detected shortly after the application of strain can be used to characterize the die swell behavior of the sample. A lower initial stress value implies that the sample will swell less after exiting the die. For the characterization of behavior of the samples the initial slope of the log (stress)—log (time) curve in the 0.01–1 s interval and the stress detected at 1 s were selected.

Figure 9:
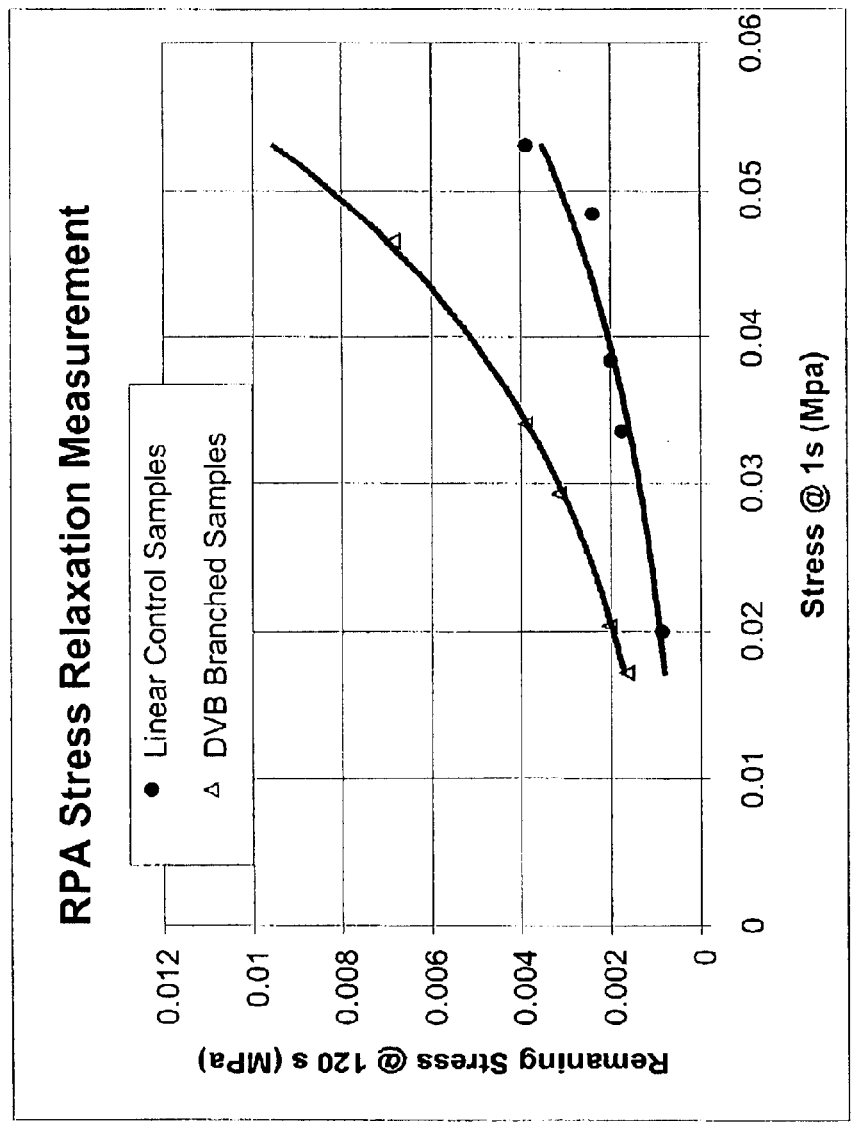
FIG. 9 is a plot showing the remaining stress at 120 s as a function of initial stress of black filled linear and branched samples.

Stress relaxation of the compounds listed in Tables 5 and 6 were measured at 125° C. The applied strain was 100%. FIG. 9 shows the remaining stress at two minutes as a function of the initial slope. FIG. 9 shows the remaining stress at two minutes as a function of stress detected at 1 s. The Figures clearly demonstrate the difference between branched and linear samples and the superior properties of branched samples. For example, at the same remaining stress at 2 minutes their initial relaxation is faster and their initial stress is lower. On the other hand at the same initial slope or initial stress their remaining stress at longer time is higher. This implies that cold-flow and extrusion properties can be improved at the same time.

The die swell of the compounded samples listed in Tables 5 and 6 were determined using a capillary viscometer (Monsanto Processability Tester (MPT)). Measurements were carried out at 125° C. using 1000 1/s shear rate and a die with an L/D ratio of 1/1. Results are listed in Table 5 and 6. They clearly indicate that the branched samples have a lower running or relaxed die swell at the same raw polymer Mooney. For example, the compound made using the 48.8 Mooney linear sample had a running die swell of 104.5% and a relaxed die swell of 122.3%. In contrast the compound of the 51.9 Mooney branched sample had only 80.8% running die swell and 92.2% relaxed die swell.

Figure 10:
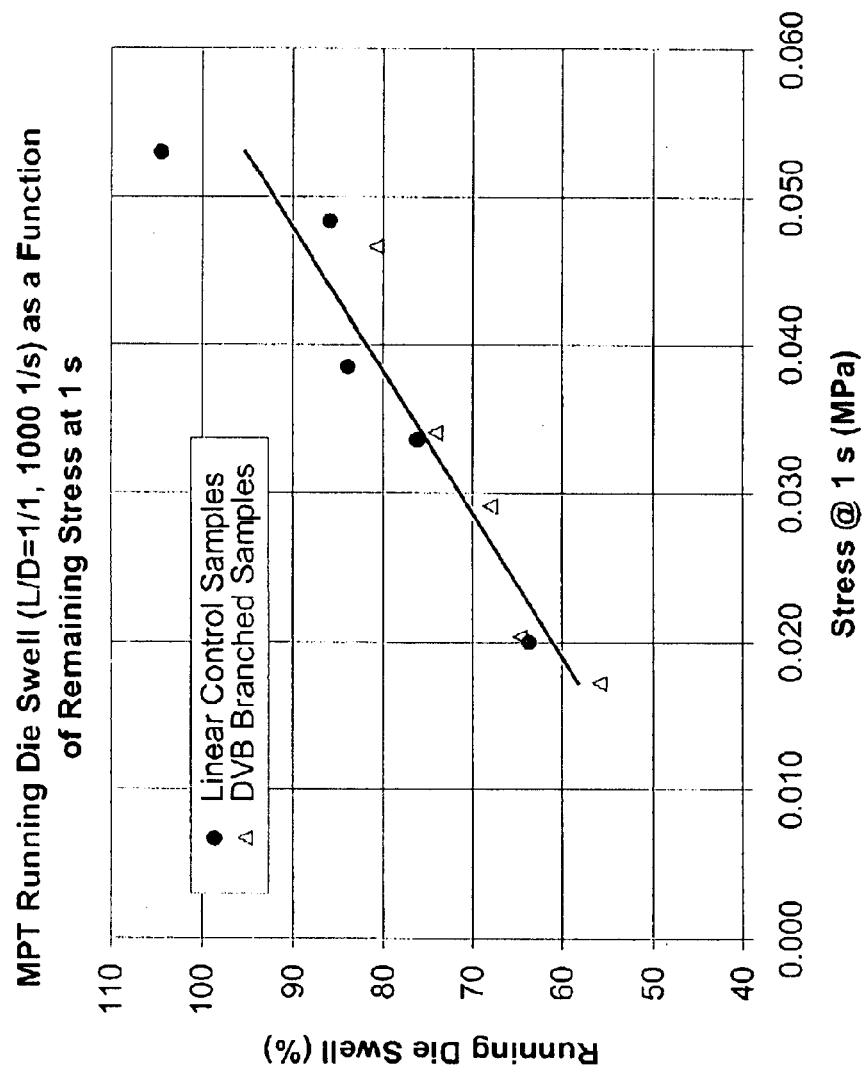
FIG. 10 is a plot showing the running die swell (determined by MPT measurements) as a function of the initial stress (determined by stress relaxation measurements) of black filled linear and branched samples.
Figure 11:
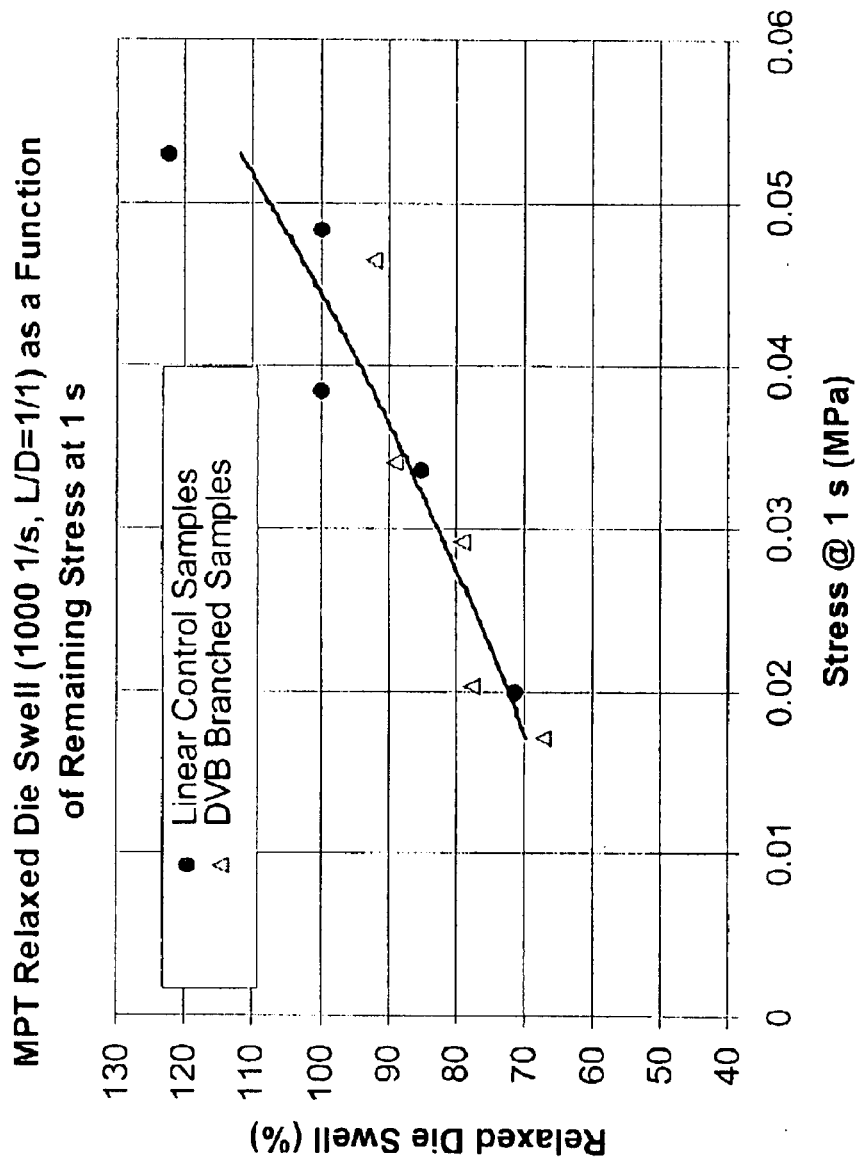
FIG. 11 is a plot showing the relaxed die swell (determined by MPT measurements) as a function of the initial stress (determined by stress relaxation measurements) of black filled linear and branched samples.
Figure 12:
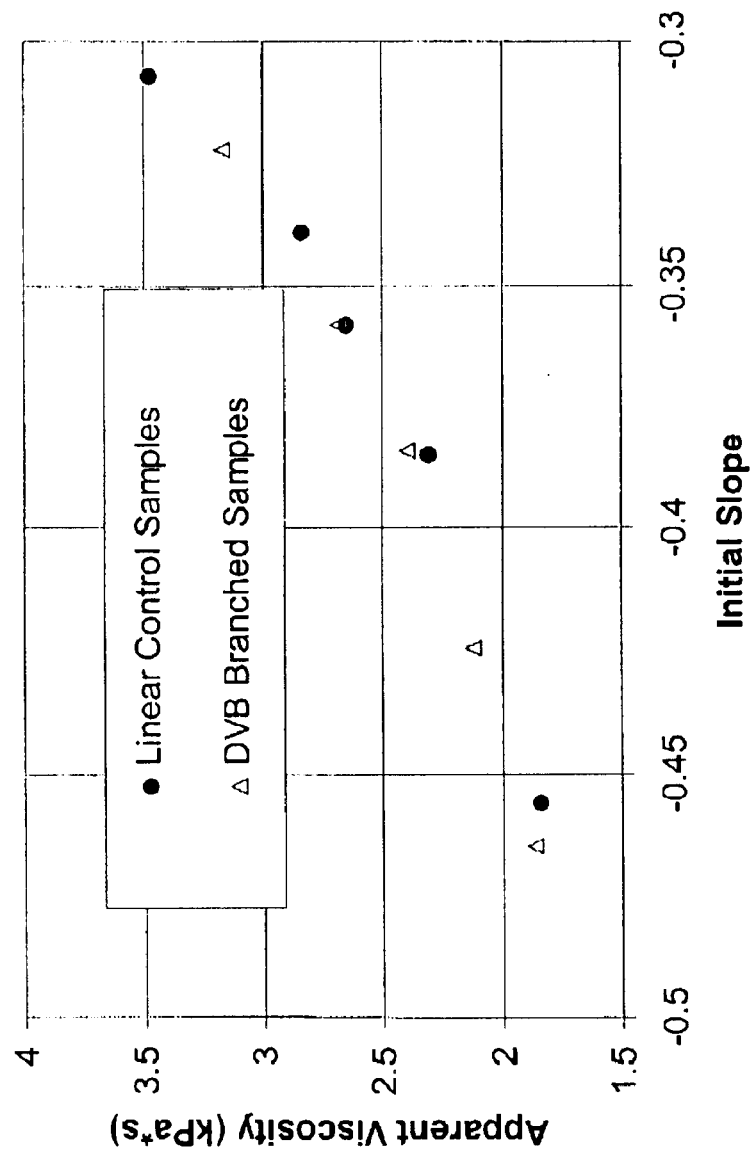
FIG. 12 is a plot showing the apparent viscosity (determined by MPT measurements) as a function of the initial slope (determined by stress relaxation measurements) of black filled linear and branched samples.
Figure 13:
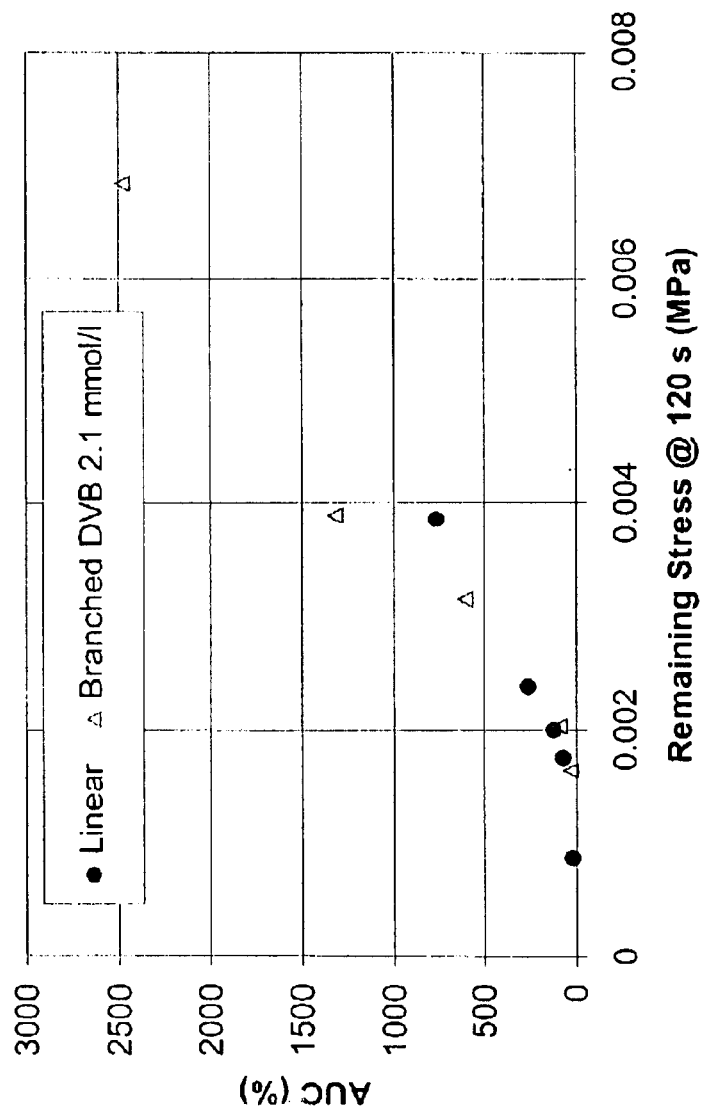
FIG. 13 is a plot showing the area under the Mooney relaxation curve of the raw polymers as a function of their remaining stress at 120 s determined by stress relaxation measurements using the black filled compounds.

FIGS. 10–13 are provided to illustrate the ability of the values determined by stress relaxation measurement to describe the processability characteristics of the samples. FIG. 10 shows that there is a strong correlation between the running die swell and the initial stress and this correlation is independent of the structure of the polymer. FIG. 11 shows that there is a strong correlation between the relaxed die swell and the initial stress and this correlation is independent of the structure of the polymer. FIG. 12 shows that there is a strong correlation between the apparent viscosity and the initial slope of the stress relaxation curve and this correlation is independent of the structure of the polymer. FIG. 13 shows that there is a strong correlation between the area under the curve determined by Mooney relaxation measurements conducted on the raw polymers and the remaining stress determined by stress relaxation measurement. This correlation is also independent of the structure of the polymer.

Cold flow properties of the compounded samples were determined using the so-called deformational (DEFO) measurements. The measurement is conducted using a 30 mm diameter and 13 mm high compression molded disk. On this disk a load (8 N) is applied and the height of the disk is measured as a function of time. Samples with higher resistance to cold flow will retain more of their original height. Table 5 and 6 lists the remaining height of the samples. According to the results, the remaining height of branched samples is higher than that of a similar Mooney linear sample. For example, the 36.9 Mooney branched sample remaining height was 11.3 mm. In contrast, the 35.8 Mooney linear sample remaining height was 10.9 mm. Only the significantly higher Mooney linear sample (Mooney 46.2) could resist to cold flow as much as the 36.9 Mooney branched sample.

EXAMPLE 5

This example shows that combination of improved properties can also be achieved in continuous polymerization.

To a continuous reactor a feed containing 71.2 wt % methylchloride, 28 wt % isobutylene and 0.8 wt % isoprene was added at 170 kg/min rate. To this feed DVB (63% purity) and TMP-1 (purity 76%) was added at a rate specified in Table 7. The polymerization was initiated by the addition of 0.1 wt % solution of $AlCl_3$ dissolved in methylchloride. Polymerization was carried out at −95° C. Additional experimental conditions are listed in Table 7.

TABLE 7

|  | Experiment No. | |
| --- | --- | --- |
|  | 24 | 25 |
| DVB (g/min) | 65 | 195 |
| TMP-1 (g/min) | 20 | 42 |
| $AlCl_3$ Solution (kg/hour) | 15 | 15 |
| Conversion (wt %) | 87 | 89 |
| Solubility (wt %) | 100 | 100 |

The Mooney of the samples is listed in Table 8, along with the measured area under the Mooney relaxation curve. For comparison purposes, test results of a linear control sample of identical Mooney viscosity is included in Table 8. This sample was also made in continuous polymerization. However, the monomer feed contained no DVB or TMP-1. The increased cold flow resistance is clearly shown by the higher area under the relaxation curve of the samples made in the presence of DVB and TMP-1.

Figure 14:
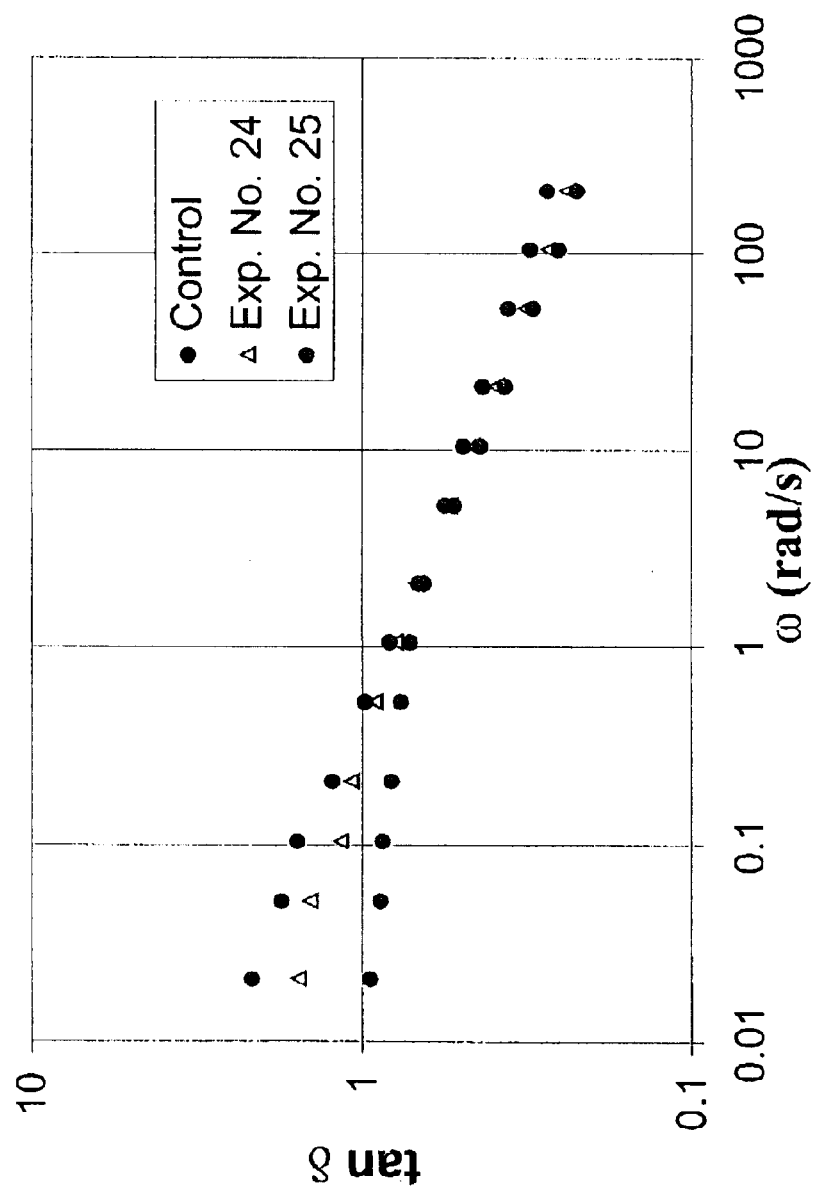
FIG. 14 is a double logarithmic plot showing the tangent delta as a function of the angular frequency of samples made in continuous polymerization.

Dynamic testing confirmed that the purposeful alteration of rheological properties was successfully achieved in the continuous polymerization too. FIG. 14. shows the results of measurements done at 125° C. using 0.72 degree arc in the 0.05–209 rad/s angular frequency range. According to the results, the tangent delta of the DVB modified samples is lower at low frequencies than that of the linear sample. On the other hand it is higher at high frequencies and the cross over point is clearly present.

TABLE 8

|  | Experiment No. | | |
| --- | --- | --- | --- |
|  | 24 | 25 | Control |
| Mooney (1 + 8 @ 125° C.) | 36.2 | 35.6 | 36.0 |
| Mooney relaxation (area under curve) | 350 | 890 | 220 |
| Running Die Swell (1000 1/s, 1/D = 1) | 63 | 63 | 68 |
| Relaxed Die Swell (1000 1/s, 1/D = 1) | 67 | 70 | 70 |
| Viscosity @ 1000 1/s (kPa * s) |  |  |  |
| Cold Flow by DEFO (remaining height after 30 min (mm)) | 10.8 | 11.2 | 10.4 |

The two samples of Example 5 along with the linear control sample were compounded with 60 phr N660 black. MPT and cold flow DEFO measurements confirmed that the samples made in the presence of DVB and TMP-1 has an improved combination of processing properties. Their increased resistance to cold flow is indicated by the higher remaining height values. According to the MPT measurements, this increased resistance to cold flow did not result in increased die swell. In fact, the running and relaxed die swell of the DVB modified samples was measured to be lower.

While the present invention has been described with reference to preferred and specifically exemplified embodiments, it will of course be understood by those of skill in the art that various modifications to these preferred and exemplified embodiments may be made without departing from the spirit and scope of the invention.

All publications, patents and patent applications referred to herein are incorporated by reference in their entirety to the same extent as if each individual publication, patent or patent application was specifically and individually indicated to be so incorporated.

What is claimed is:

1. A butyl polymer having improved processability, prepared with a reaction mixture comprising:
   (i) a monomer mixture comprising a $C_4$ to $C_7$ monoolefin monomer and a $C_4$ to $C_{14}$ multiolefin monomer or β-pinene;
   (ii) a multiolefin cross-linking agent; and
   (iii) a chain transfer agent.

2. The butyl polymer according to claim 1, wherein the $C_4$ to $C_7$ monoolefin monomer is selected from the group comprising isobutylene, 2-methyl-1-butane, 3-methyl-1-butene, 2-methyl-2-butene, 4-methyl-1-pentene and mixtures thereof.

3. The butyl polymer according to claim 2, wherein the $C_4$ to $C_7$ monoolefin monomer comprises isobutylene.

4. The butyl polymer according to claim 1, wherein the $C_4$ to $C_{14}$ multiolefin monomer is selected from the group comprising isoprene, butadiene, 2-methyl-butadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

5. The butyl polymer according to claim 4, wherein the $C_4$ to $C_{14}$ multiolefin monomer comprises isoprene.

6. The butyl polymer according to claim 1, wherein the monomer mixture comprises from about 80% to about 99% by weight $C_4$ to $C_7$ monoolefin monomer and from about 1.0% to about 20% by weight $C_4$ to $C_{14}$ multiolefin monomer or β-pinene.

7. The butyl polymer according to claim 6, wherein the monomer mixture comprises from about 85% to about 99% by weight $C_4$ to $C_7$ monoolefin monomer and from about 1.0% to about 15% by weight $C_4$ to $C_{14}$ multiolefin monomer or β-pinene.

8. The butyl polymer according to claim 7, wherein the monomer mixture comprises from about 95% to about 99% by weight $C_4$ to $C_7$ monoolefin monomer and from about 1% to about 5.0% by weight $C_4$ to $C_{14}$ multiolefin monomer or β-pinene.

9. The butyl polymer according to claim 1, wherein the multiolefin crosslinking agent comprises a diolefinic hydrocarbon compound.

10. The butyl polymer according to claim 9, wherein the multiolefin crosslinking agent is selected from the group comprising divinylbenzene, diisopropenylbenzene, divinyltoluene, divinylxylene and a $C_1$ to $C_{20}$ alkyl-substituted derivatives thereof.

11. The butyl polymer according to claim 10, wherein the multiolefin crosslinking agent comprises divinylbenzene.

12. The butyl polymer according to claim 1, wherein the multiolefin crosslinking agent is present in the reaction mixture in an amount in the range of from about 0.01% to about 3.0% by weight based on the amount of the $C_4$ to $C_7$ monoolefin monomer in the monomer mixture.

13. The butyl polymer according to claim 12, wherein the multiolefin crosslinking agent as present in the reaction mixture in an amount in the range of from about 0.05% to about 1.0% by weight based on the amount of the $C_4$ to $C_7$ monoolefin monomer in the monomer mixture.

14. The butyl polymer according to claim 13, wherein the multiolefin crosslinking agent as present in the reaction mixture in an amount in the range of from about 0.1% to about 0.4% by weight based on the amount of the $C_4$ to $C_7$ monoolefin monomer in the monomer mixture.

15. The butyl polymer according to claim 1, wherein the chain transfer agent is selected from the group comprising piperylene, 1-methylcycloheptene, 1-methylcyclo-pentene, 2-ethyl-1-hexene, 2,4,4-trimethyl-1-pentene, indene and mixtures thereof.

16. The butyl polymer according to claim 15, wherein the chain transfer agent comprises 2,4,4-trimethyl-1-pentene.

17. The butyl polymer according to claim 1, wherein the chain transfer agent is present in the reaction mixture in an amount in the range of from about 0.01% to about 2.0% by weight based on the amount of the $C_4$ to $C_7$ monoolefin monomer in the monomer mixture.

18. The butyl polymer according to claim 17, wherein the chain transfer agent is present in the reaction mixture in an amount in the range of from about0.01% to about 1.4% by weight based on the amount of the $C_4$ to $C_7$ monoolefin monomer in the monomer mixture.

19. The butyl polymer according to claim 18, wherein the chain transfer agent is present in the reaction mixture in an amount in the range of from about 0.05% to about 0.5% by weight based on the amount of the $C_4$ to $C_7$ monoolefin monomer in the monomer mixture.

20. The butyl polymer according to claim 1, wherein the polymer comprises a halogenated butyl polymer.

21. The butyl polymer according to claim 20, wherein the polymer is brominated.

22. The butyl polymer according to claim 20, wherein the polymer is chlorinated.

23. The butyl polymer according to claim 20, wherein the amount of halogen is in the range of from about 0.1 to about 8% by weight of the polymer.

24. The butyl polymer according to claim 23, wherein the amount of halogen is in the range of from about 0.5 to about 4% by weight of the polymer.

25. The butyl polymer according to claim 24, wherein the amount of halogen is in the range of from about 1.5 to about 3% by weight of the polymer.

26. A process for preparing a butyl polymer having improved processability, comprising the step of continuing a reaction mixture comprising:

(i) a monomer mixture comprising a $C_4$ to $C_7$ monoolefin monomer and a $C_4$ to $C_{14}$ multiolefin monomer or β-pinene;

(ii) a multiolefin cross-linking agent;

(iii) a chain transfer agent; and (iv) a catalyst system.

27. The process according to claim 26, wherein the $C_4$ to $C_7$ monoolefin monomer is selected from group comprising isobutylene, 2-methyl-1-butene, 3-methyl-1-butene, 2-methyl-2-butene, 4-methyl-1-pentene, and mixtures thereof.

28. The process according to claim 26, wherein the $C_4$ to $C_7$ monoolefin monomer comprises isobutylene.

29. The process according to claim 26, wherein the $C_4$ to $C_{14}$ multiolefin monomer is selected from the group comprising isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

30. The process according to claim 29, wherein the $C_4$ to $C_{14}$ multiolefin monomer comprises isoprene.

31. The butyl polymer according to claim 26, wherein the monomer mixture comprises from about 80% to about 99% by weight $C_4$ to $C_7$ monoolefin monomer and from about 1.0% to about 20% by weight $C_4$ to $C_{14}$ multiolefin monomer or β-pinene.

32. The butyl polymer according to claim 31, wherein the monomer mixture comprises from about 85% to about 99% by weight $C_4$ to $C_7$ monoolefin monomer and from about 1.0% to about 15% by weight $C_4$ to $C_{14}$ multiolefin monomer or β-pinene.

33. The butyl polymer according to claim 32, wherein the monomer mixture comprises from about 95% to about 99% by weight $C_4$ to $C_7$ monoolefin monomer and from about 1% to about 5.0% by weight $C_4$ to $C_{14}$ multiolefin monomer or β-pinene.

34. The process according to claim 26, wherein the multiolefin crosslinking agent comprises a diolefinic hydrocarbon compound.

35. The process according to claim 34, wherein the multiolefin crosslinking agent is selected from the group comprising divinylbenzene, diisopropenylbenzene, divinyltoluene, divinylxylene and a $C_1$ to $C_{20}$ alkyl-substituted derivatives thereof.

36. The process according to claim 35, wherein the multiolefin crosslinking agent comprises divinyl-benzene.

37. The process according to claim 26, wherein the multiolefin crosslinking agent is present in the reaction mixture in an amount in the range of from about 0.01% to about 3.0% by weight based on the amount of the $C_4$ to $C_7$ monoolefin monomer in the monomer mixture.

38. The process according to claim 37, wherein the multiolefin crosslinking agent is present in the reaction mixture in an amount in the range of from about 0.05% to about 1.0% by weight based on the amount of the $C_4$ to $C_7$ monoolefin monomer in the monomer mixture.

39. The process according to claim 38, wherein the multiolefin crosslinking agent is present in the reaction mixture in an amount in the range of from about 0.1% to about 0.4% by weight based on the amount of the $C_4$ to $C_7$ monoolefin monomer in the monomer mixture.

40. The butyl polymer according to claim 26, wherein the chain transfer agent is selected from the group comprising piperylene, 1-methylcycloheptene, 1-methylcyclopentene, 2-ethyl-1-hexene, 2,4,4-trimethyl-1-pentene, indene and mixtures thereof.

41. The process according to claim 40, wherein the chain transfer agent comprises 2,4,4trimethyl-1-pentene.

42. The process according to claim 26, wherein the chain transfer agent is present in the reaction mixture in an amount in the range of from about 0.01% to about 2.0% by weight based on the amount of th $C_4$ to $C_7$ monoolefin monomer in the monomer mixture.

43. The process according to claim 42, wherein the chain transfer agent is present in the reaction mixture in an amount in the range of from about 0.05% to about 1.4% by weight based on the amount of th $C_4$ to $C_7$ monoolefin monomer in the monomer mixture.

44. The process according to claim 43, wherein the chain transfer agent is present in the reaction mixture in an amount in the range of from about 0.1% to about 0.5% by weight based on the amount of th $C_4$ to $C_7$ monoolefin monomer in the monomer mixture.

* * * * *

UNITED STATES PATENT AND TRADEMARK OFFICE
CERTIFICATE OF CORRECTION

PATENT NO. : 6,841,642 B2
DATED : January 11, 2005
INVENTOR(S) : Gabor Kaszas

It is certified that error appears in the above-identified patent and that said Letters Patent is hereby corrected as shown below:

Column 19,
Line 41, replace "continuing" " with -- contacting --.

Signed and Sealed this

Twelfth Day of July, 2005

JON W. DUDAS
*Director of the United States Patent and Trademark Office*